(12) United States Patent  (10) Patent No.: US 6,709,471 B2
Miyamoto  (45) Date of Patent: Mar. 23, 2004

(54) SINGLE LAYER CARBON NANOTUBE ELECTRODE BATTERY

(75) Inventor: Yoshiyuki Miyamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 277 days.

(21) Appl. No.: 09/881,766

(22) Filed: Jun. 18, 2001

(65) Prior Publication Data

US 2002/0006547 A1 Jan. 17, 2002

(30) Foreign Application Priority Data

Jul. 11, 2000 (JP) ........................... 2000-210186

(51) Int. Cl.[7] .................. H01M 4/58; H01M 10/36
(52) U.S. Cl. ................. 29/623.1; 29/623.5; 429/188; 429/231.8
(58) Field of Search .............. 429/188, 231.8; 29/623.1, 623.5; 427/115, 122

(56) References Cited

U.S. PATENT DOCUMENTS 6,280,697 B1 * 8/2001 Zhou et al. .................. 423/414
6,495,290 B1 * 12/2002 Hinokuma et al. ....... 429/231.8

FOREIGN PATENT DOCUMENTS

| JP | 07014573 A | * | 1/1995 | ............ H01M/4/02 |
| JP | 07014582 A | * | 1/1995 | ............ H01M/4/62 |
| JP | 10-125321 | | 5/1998 | |
| JP | 11-329414 | | 11/1999 | |
| JP | 2000207953 A | * | 7/2000 | ............ H01B/11/18 |

OTHER PUBLICATIONS

J Charlier et al. "Microscopic growth mechanisms for carbon and boron–nitride nanotubes" Feb. 1999, Applied Physics A, vol. 68, pp. 267–273.*

K. Suenaga et al. "Organisation of carbon and boron nitride layers in mixed nanoparticles and nanotubes synthesised by arc discharge". Feb. 1999, Applied Physics A, vol. 68, pp. 301–308.*

* cited by examiner

*Primary Examiner*—Gregg Cantelmo
(74) *Attorney, Agent, or Firm*—McGinn & Gibb, PLLC

(57) ABSTRACT

A battery material which has following constitution: a single-layer carbon nanotube having a small diameter is placed into a single-layer carbon nanotube having a large diameter such that the nanotubes are isolated from each other, a boron nitride nanotube is used as an insulating layer, and the carbon nanotubes and the boron nitride nanotube have a common tube axis; and this material is reduced in mass with respect to a charging capacity, improved in power supply, and free from deterioration.

17 Claims, 3 Drawing Sheets

SINGLE LAYER CARBON NANOTUBE ELECTRODE BATTERY

FIELD OF THE INVENTION

The present invention relates to a field of energy, and particularly, to a field of battery material development and portable small-sized electronic equipment.

BACKGROUND OF THE INVENTION

As electronic equipment has been more compact, a higher energy density has been demanded for a battery. In order to respond to such needs, a variety of nonaqueous electrolyte batteries such as a lithium battery have been proposed and put into practical use. However, particularly in the case of a secondary battery, a battery using lithium metal as a negative electrode has problems as follows:

(1) The battery requires 5 to 10 hours for charging and is inferior in quick charge.
(2) Cyclic lifetime is short.

These problems all result from lithium metal. It is understood that the causes are a change in the form of lithium caused by frequent charging and discharging, the form of dendrite lithium, non-reversible change of lithium and so on. Hence, as a method for solving the above problems, a carbonaceous material has been proposed as a negative electrode. This method uses a carbon intercalation compound of lithium that is electrochemically formed with ease. For example, when charging is performed in a nonaqueous electrolyte solution while using carbon as a negative electrode, lithium contained in a positive electrode is electrochemically doped between layers made of negative electrode carbon. And then, lithium-doped carbon acts as a lithium electrode, and lithium is de-doped while discharging between carbon layers and returns to the positive electrode.

JP 2513418 (B2) disclosed a black mix for a battery electrode contains as positive electrode active material (such as a manganese dioxide or lithium transition metal oxide), and as a positive electrode electroconductivity giving agent, a carbonaceous material containing carbon nanotube or carbonaceous material containing carbon nanotube including metal ions is added to this black mix.

JP 2526789 (B2) disclosed secondary battery having positive electrode, separator, nonaqueous electrolyte solution and negative electrode made of carbon material, characterized in that carbon material containing carbon nanotube is used for active material of negative electrode.

In this battery, a carbon rod (having the diameter of 20 mm in the helium atmosphere of 500 Torr) is used as a negative electrode and a carbon rod of 10 mm is used as a positive electrode. A DC discharge is performed to obtain a carbon nano-tube containing carbonic material. The content is set to about 60%, the contained powder of 0.9 (g) and Teflon powder of 0.01 (g) are kneaded in an agate mortar to mold a sheet of 3 mm, and it is punched into a disk shape as a negative electrode active material 1. A lithium foil is used for a positive electrode active material 3 and a reference electrode 6. $LiPF_6$ is solved to the concentration of 1 mol/l in a mixed solvent of ethylene carbonate and diethyl carbonate mixed at the volume ratio of 50%/50% for use as an electrolyte. A polypropylene porous film of 25 μm is used for a separator 5. A stable characteristic can be obtained.

JP unexamined laid-open 10-125321 (A) disclosed a carbon material for negative electrode of battery, characterized in that said material is constituted in monolayer carbon nano-tubes with open ends those are aggregated in same axis.

In the battery using this material, a graphite rod containing 50% of nickel powder is used as a positive electrode, while a pure graphite rod is used as a negative electrode. 200-ampere DC discharge is caused across both the electrodes in a 400-Torr helium atmosphere, thereby forming a deposit on the negative electrode. This deposit is crushed and held in the air at 750° C. for 30 minutes, and then cooled to room temperature. Thereafter, the crushed material is mixed with 1 mol of a nitrate water solution, and held at 140° C. for 5 hours. A monolayer nano-tube has an overall tubular shape and has a single layer with one of ends 2a and 2b kept open. Also, the tube needs to contain lithium equivalent to charge and discharge capacity equal to or above 250 mAh per gram of negative electrode carbonaceous material. In the embodiment, the discharge capacity of 520 mAh/g and the discharge capacity of 410 mAh/g are respectively obtained.

JP unexamined laid-open 11-329414 disclosed an electrode comprising:
conductive matrix comprising disulfide groups, the S—S bonds of said disulfide groups are splitted by electrochemical reduction, and restored by electrochemical oxidation;
plural of carbon nano-tubes dispersed in said conductive matrix, and substantially disentangled.

In this electrode, an average diameter of carbon tubes is set to 3.5–200 nm, preferably, 5–30 nm, and the average length is set to at least 5 times or more the diameter, preferably, 100–10,000 times the diameter. The aspect ratio of carbon nano-tube is set to more than 5, desirably larger than 100, and more preferably, more than 1,000. The electrode has a structure substantially containing no carbon nano-tube aggregate. The electrode contains 0.5–6 wt. %, preferably 1–4 wt. % of carbon nano-tubes on the basis of the total of the conductive matrix and the carbon tubes.

At this moment, a charge quantity (mAh/g) per unit weight of a carbonaceous material is determined by a dope quantity of lithium. Thus, as for such a negative electrode, it is preferable to set a dope quantity of lithium as large as possible.

Further, regarding a battery material in which alkaline metal such as lithium is doped, when a dope quantity of alkaline metal increases, saturation occurs on a total quantity of charge transfer from alkaline metal to a carbonaceous material. In the case of a graphite structure, theoretically, an upper limit is a ratio of one alkaline metallic atom to six carbon atoms.

Even when more alkaline doping is performed, a quantity of charge injection does not increase. Thus, the above upper limit is a limit of a charge quantity per unit weight of a carbonaceous material. Moreover, due to chemical reaction of alkaline metal and surrounding materials constituting the battery, degradation of a battery material is inevitable after extended hours of use.

Therefore, the object of the present invention is to achieve battery materials which are reduced in mass relative to a charging capacity, increases in power supply, and is free from deterioration when used for a long time.

SUMMARY OF THE INVENTION

In order to solve the above-mentioned problems, in a battery described in claim 1 of the present invention, a single-layer carbon nanotube having a small diameter is placed in a single-layer carbon nanotube having a large diameter such that the nanotubes are insulated from each other.

Also, the battery described in claim 2 of the present invention uses a boron nitride nanotube as an insulating layer.

Further, according to the battery described in claim 3 of the present invention, first and second electrodes connected respectively to the single-layer carbon nanotubes having different diameters. The single-layer carbon nanotubes are insulated from each other via the boron nitride nanotube.

Additionally, according to the battery described in claim 4 of the present invention, the carbon nanotubes and the boron nitride nanotube have a common tube axis.

Furthermore, according to the battery described in claim 5 of the present invention, after discharging, charging is performed when a potential difference is made between the first and second electrodes.

DESCRIPTION OF THE PREFERRED EMBODIMENT

A battery of the present invention is made of boron, carbon, and nitrogen, unlike the conventional battery using battery materials of alkali doping.

Battery materials used in the present invention are each constituted by a multi-layer nanotube. The multi-layer nanotube has a configuration in which a boron nitride nanotube having several layers is inserted between double-layer structures of carbon nanotubes having different diameters.

In the multi-layer nanotube used for the battery of the present invention, the double-layer carbon nanotubes are not adjacent to each other. For example, the nanotubes are separated via a boron nitride nanotube having ten layers. Since the boron nitride nanotube acts as an insulator, charge is not transferred between the carbon nanotubes.

However, the carbon nanotube is smaller in work function as its diameter decreases. Thus, when the carbon nanotubes with different diameters are in contact with each other via a suitable electrode, charge is transferred from the carbon nanotube having a larger diameter to the carbon nanotube having a small diameter, causing electromotive force. After charge is transferred completely, when a potential difference appears such that the inner carbon nanotube is negative and the outer carbon nanotube is positive, charge is transferred in reverse and is stored in the battery.

Since such battery materials can transfer electrons without chemical reaction, the chemical stability is remarkable. Therefore, the multi-layer nanotube used in the present invention does not have chemical reaction with surrounding materials and the material is not deteriorated even after frequent use.

The following will discuss a specific example.

First, a multi-layer boron nitride nanotube is formed on an outer wall of a single-layer carbon nanotube. A forming method is heat treatment, which uses lithium as a catalyst. At this moment, a lithium atom is not captured into the nanotube (reference: Taguchi, Suzuki, Matsuda, Kimura, Terauchi, Tanaka, Suematsu—The Physical Society of Japan Digest 1997 Fall, second fascicle p. 304). Thereafter, another single-layer carbon nanotube is formed on the multi-layer boron nitride nanotube. Hence, the configuration of the multi-layer nanotube is completed in which the two carbon nanotubes with different diameters are partitioned by the boron nitride nanotube serving as an insulating material.

Figure 1:
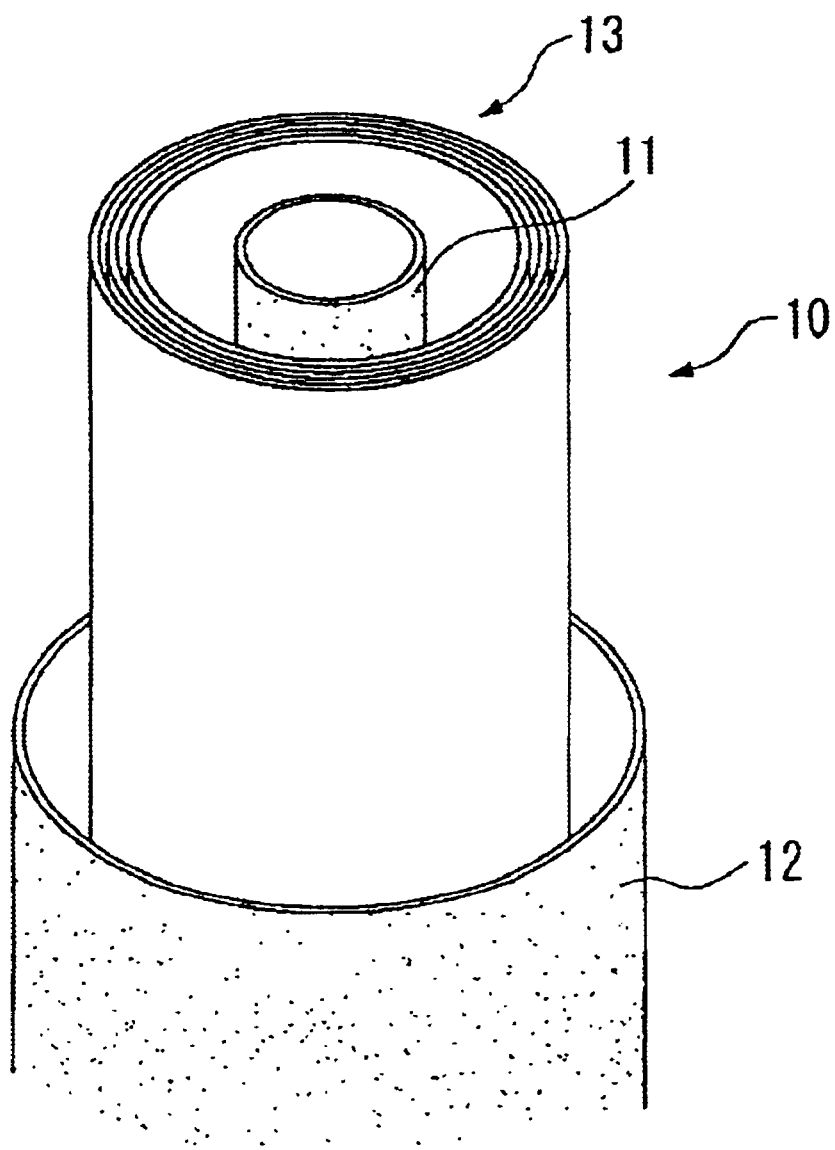
FIG. 1 is a diagram showing a multi-layer nanotube constituting a battery of the present invention.

FIG. 1 shows the configuration of the multi-layer nanotube constituting the battery of the present invention.

A multi-layer nanotube 10 has single-layer carbon nanotubes 11 and 12 partitioned by a multi-layer boron nitride nanotube 13.

A conventional experiment shows a configuration similar to FIG. 1 (reference: K. Suenaga, F. Willaime, A. Loiseau, and C. Colliex, Appl. Phys. A, Vol. 68, p. 301 (1999)). However, a carbon nanotube has a multi-layer structure in this reference material. Thus, strictly speaking, the above conventional experiment is different from FIG. 1. Additionally, any conventional reports have not been made on the battery described in the present invention, in which the multi-layer nanotube 10 having the single-layer carbon nanotubes 11 and 12 and the multi-layer boron nitride nanotube 13 is applied as a battery.

Figure 2:
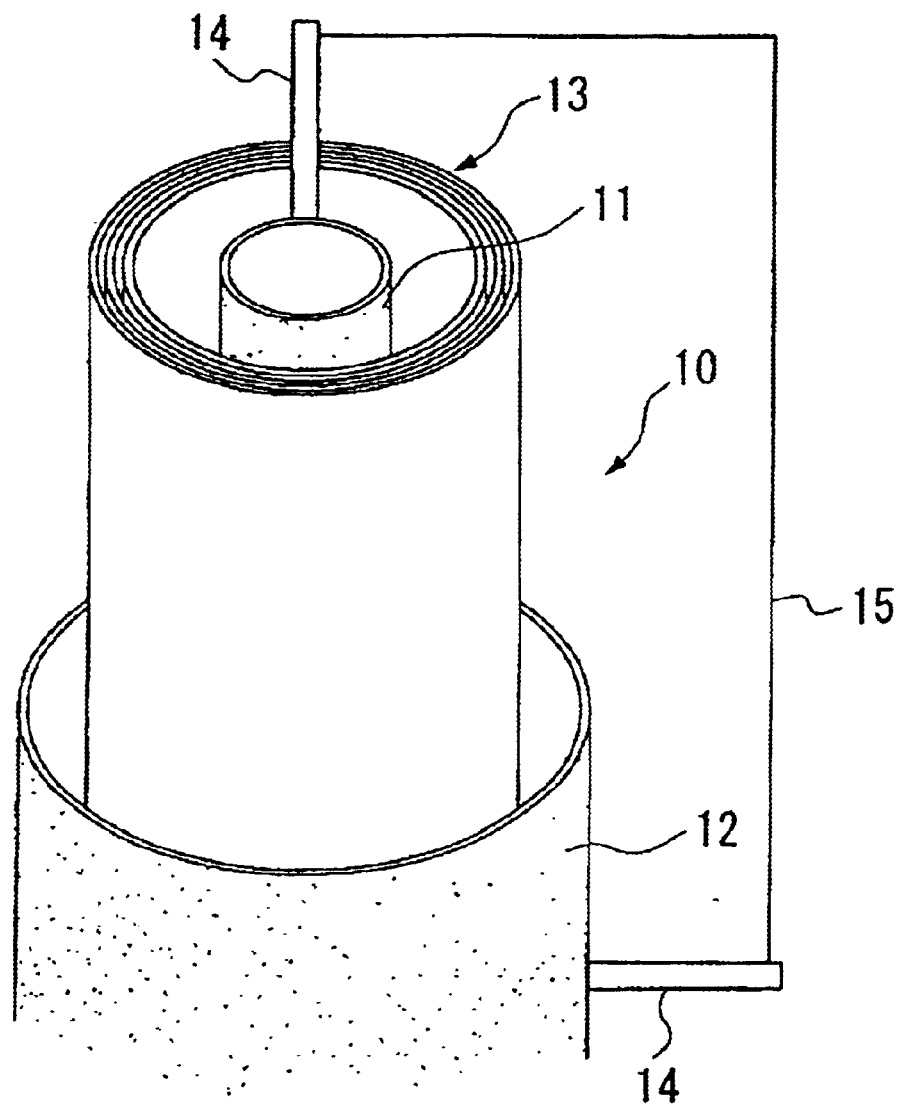
FIG. 2 is a diagram showing that metallic electrodes are placed onto single-layer carbon nanotubes of the multi-layer nanotube constituting the battery of the present invention.

In order to apply the multi-layer nanotube 10 as a battery, as shown in FIG. 2, particles (several nm in diameter) composed of platinum metal atoms are placed as electrodes on the ends of the inner carbon nanotube 11 and the outer carbon nanotube 12.

The carbon nanotube is smaller in work function as its curvature increases (namely, a smaller diameter). Therefore, when electrodes 14, 14 of the carbon nanotubes 11 and 12 are brought into contact with each other through a conductor 15, electrons are transferred from the outer carbon nanotube 12 to the inner carbon nanotube 11.

As a result of a first principle computing, it is found that a total quantity of transferred electrons corresponds to $\frac{1}{10}$ electrons with respect to a length of 2.46 Å along the axis of the multi-layer nanotube 10. Therefore, it is understood that the multi-layer nanotube 10 can store a quantity of charge that corresponds to $1.6 \times 10^{-12}$ coulomb with respect to a length of 2.46 cm along the axis while the electrodes are not in contact with each other.

Assuming that the multi-layer nanotube 10 has an outmost diameter of 100 Å, the multi-layer nanotube 10 with a length of 2.36 cm is $7.72 \times 10^{-12}$ $cm^3$ in volume and $50 \times 10^{-12}$ g in weight. Hence, a quantity of stored charge is 0.032 coulomb ($9.59 \times 10^7$ esu) per gram.

For this reason, the multi-layer nanotube 10 remarkably increases in a quantity of stored charge per weight.

Figure 3:
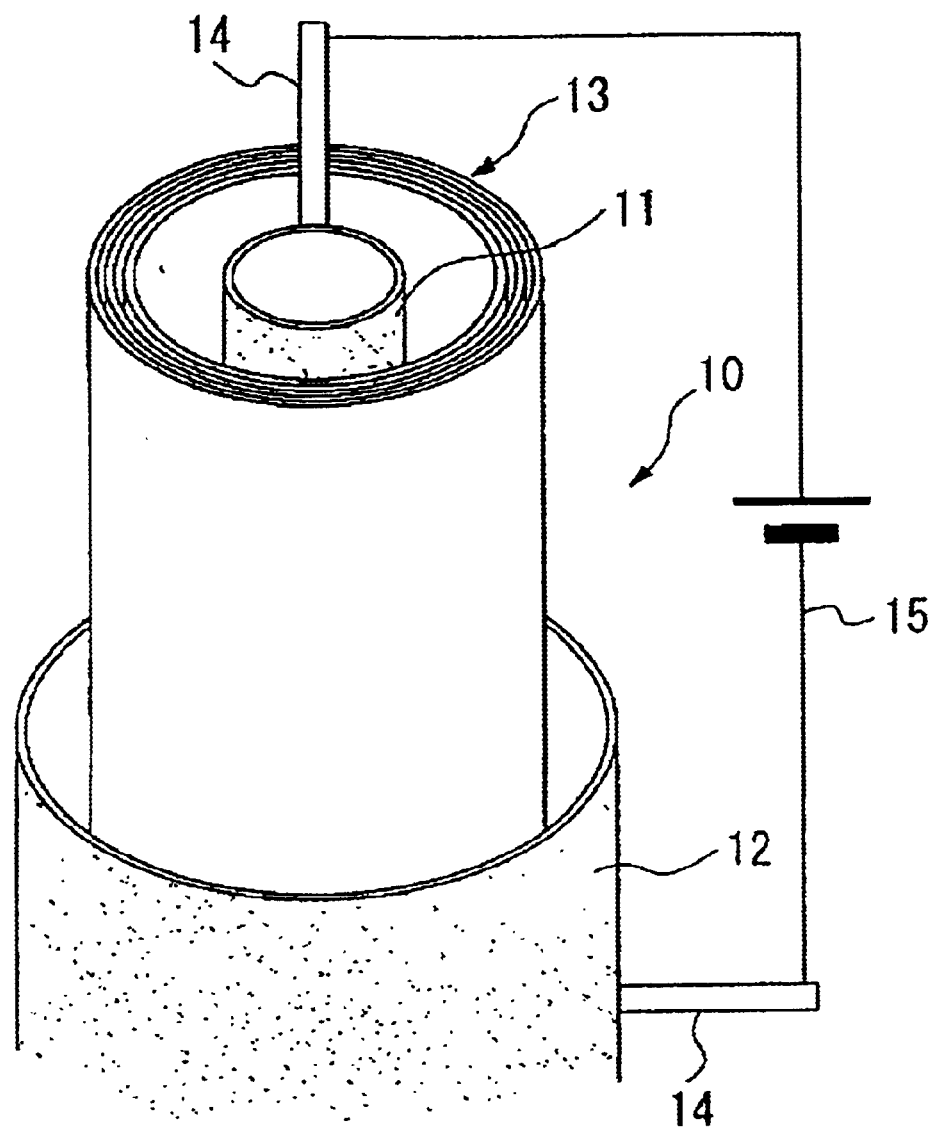
FIG. 3 is a diagram showing that a potential difference is made between the carbon nanotubes constituting the battery of the present invention and charge is stored therein.

Moreover, after using the battery of the present invention, as shown in FIG. 3, a potential difference is made between the electrodes such that the inner carbon nanotube 11 is negative and the outer carbon nanotube 12 is positive. Thus, charge can be stored in the battery.

Since such a process of storing and releasing charge does not require any chemical reaction at all, materials are free from deterioration even after frequent use of the battery.

As described above, according to a battery of the present invention, a single-layer carbon nanotube having a small diameter is placed into a single-layer carbon nanotube having a large diameter such that the nanotubes are insulated from each other, a boron nitride nanotube is used as an insulating layer, first and second electrodes are connected respectively to the carbon nanotubes, the carbon nanotubes and the boron nitride nanotube have a common tube axis, and after discharging, charging is carried out when a potential difference is made between the first and second electrodes. Hence, it is possible to readily reduce a mass of battery materials relative to a charging capacity and to increase power supply, thereby improving the performance of portable electronic equipment. Further, the battery materials are not deteriorated and can be all recycled, resulting in environmentally sound materials.

What is claimed is:

1. A battery, comprising:

a first single-layer carbon nanotube including a first diameter;

a second single-layer carbon nanotube including a second diameter formed inside said first single-layer carbon nanotube; and an insulating layer separating said first and second nanotubes such that said first and second nanotubes are insulated from each other.

2. The battery according to claim 1, wherein said insulating layer comprises a boron nitride nanotube.

3. The battery according to claim 1, further comprising:

first and second electrodes connected respectively to the single-layer carbon nanotubes having different diameters and insulated from each other.

4. The battery according to claim 1, wherein the carbon nanotubes and the insulating layer have a common tube axis.

5. The battery according to claim 1, wherein a potential difference exists between the first single-layer carbon nanotube and the second single-layer carbon nanotube to permit charging for storage in said battery, subsequent to discharging.

6. The battery according to claim 2, further comprising:

first and second electrodes connected respectively to the single-layer carbon nanotubes having different diameters and insulated from each other by the boron nitride nanotube.

7. The battery according to claim 2, wherein the carbon nanotubes and the boron nitride nanotube have a common tube axis.

8. The battery according to claim 3, wherein the carbon nanotubes and the insulating layer have a common tube axis.

9. The battery according to claim 3, wherein a potential difference exists between the first and second electrodes to permit charging for storage in said battery, subsequent to discharging.

10. The battery according to claim 3, wherein said insulating layer comprises boron nitride layers.

11. The battery according to claim 4, wherein a potential difference exists between the first and second electrodes to permit charging for storage in said battery, subsequent to discharging.

12. The battery according to claim 1, wherein said single-layer carbon nanotubes comprise a platinum metal atom portion.

13. The battery according to claim 1, wherein said battery has an operational charge of $1.6 \times 10^{-12}$ coulombs and a length of 2.46 cm.

14. The battery according to claim 1, wherein said battery has an operational quantity of stored charge of 0.032 coulomb per gram.

15. The battery according to claim 1, wherein said battery comprises an outer diameter of 100 Å.

16. The battery according to claim 15, wherein said battery has an operational length of 2.36 cm with a volume of $7.72 \times 10^{-12}$ cm$^3$ and a weight of $50 \times 10^{-12}$ gm.

17. A method of forming battery, comprising:

forming a first single-layer carbon nanotube including a first diameter;

forming multi-layer boron nitride on an outer-wall of said first single-layer carbon nanotube; and forming a second single-layer carbon nanotube, including a second diameter, on said multi-layer boron nitride, wherein said first single-layer carbon nanotube is partitioned from said second single-layer carbon nanotube layer by said multi-layer boron nitride.

* * * * *